Figure 1:
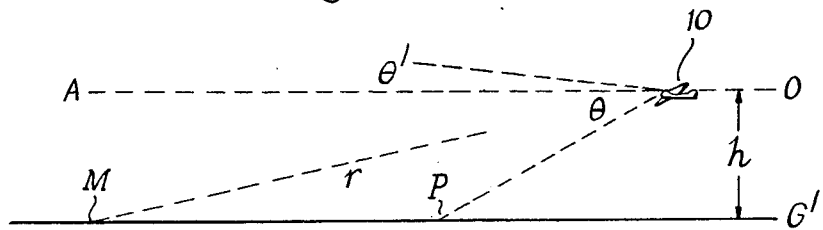

July 5, 1966     M. S. FLOWER ETAL     3,258,855
FLIGHT TRAINING APPARATUS
Filed Nov. 18, 1963

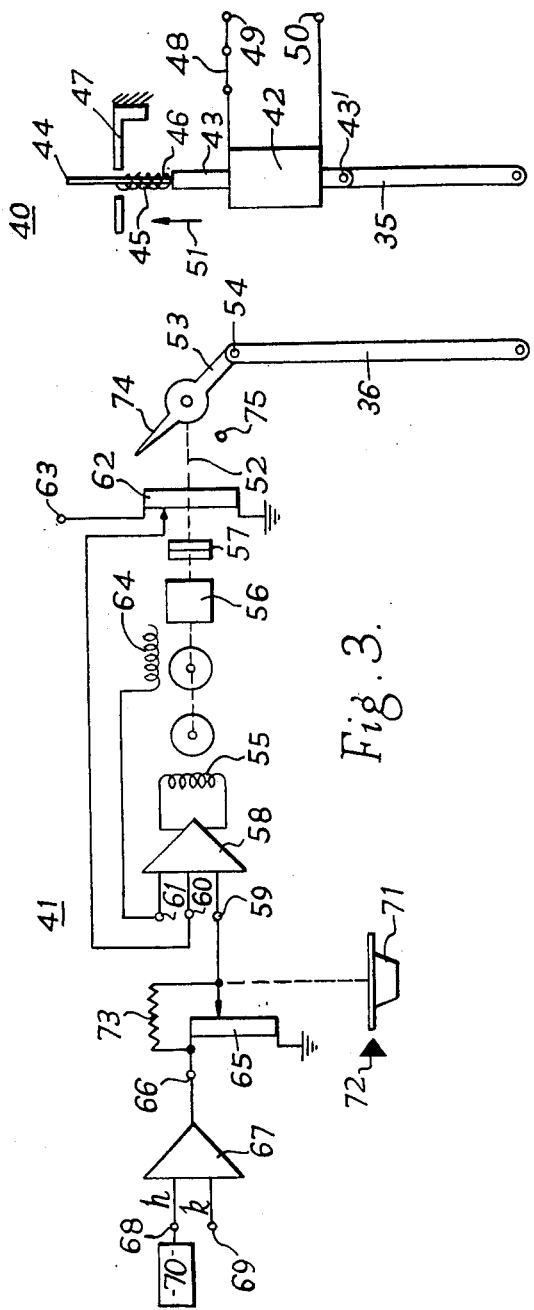

United States Patent Office 3,258,855
Patented July 5, 1966

3,258,855
FLIGHT TRAINING APPARATUS
Maurice S. Flower, Forest Row, and Roy A. G. Gasson, Tilgate, Crawley, England, assignors to Communications Patents Limited
Filed Nov. 18, 1963, Ser. No. 324,412
Claims priority, application Great Britain, Nov. 26, 1962, 44,579/62
5 Claims. (Cl. 35—12)

This invention relates to ground based flight training apparatus in which visual effects are simulated to correspond to the view seen by the crew of an aircraft during actual flight, and in particular to apparatus in which visual effects can be simulated at will corresponding to the view seen when actually taking-off or landing under adverse weather conditions.

In modern flight training, use is made of flight simulators of the type which provides a visual presentation of objects seen from the flight deck of an aircraft during low altitude phases of a flight, in addition to providing instruments responsive to settings of the flight and engine controls of the aircraft simulated.

Visual systems capable of providing a high degree of realism advantageously employ a television camera to view a detailed scale model. The scene presented to the trainee crew is then provided by a television receiver fed with signals from the television camera. The camera is movable relatively to the model, so that the view presented of the external objects provided in the model changes correspondingly to the simulated movement of an aircraft.

In actual flying, take-off and landing operations become more difficult in weather conditions where visibility is reduced below normal by mist or fog. It is desirable, therefore, to provide effects corresponding to such conditions in visual flight training apparatus.

It is an object of one form of the present invention to provide, in ground-based flight training and visual simulating apparatus, means whereby visual effects corresponding to the presence of mist may be simulated.

It is a further object of another form of the present invention to provide, in such apparatus, means whereby visual effects corresponding to the presence of fog may be simulated.

Accordingly the invention provides ground-based flight training apparatus, including apparatus for simulating visual effects corresponding to the simulated flight of an aircraft, comprising a representation of the surface of the earth and a camera with a lens system for viewing at least a portion of the said representation, at least one optical screen mounted for movement into and out of the optical path between the lens system and the representation to partially obscure the camera view of the said representation and mechanical means attached to the optical screen for controlling the movement thereof.

One form of the invention provides ground-based flight training apparatus as defined in the preceding paragraph in which the said screen is optically translucent and is mounted above the lens system for movement downwardly to intercept the optical path thereof and the said mechanical means controls the movement of the optical screen so that the extent to which the optical path is intercepted varies according to the computed height of the simulated aircraft.

In the preceding paragraphs, and in the appended claims, the term "representation of the surface of the earth" is to be understood in a broad sense, since the representation may be of an aircraft carrier flight deck together with surrounding sea features.

In the preceding paragraph, and in the appended claims, where movement of an optical screen relatively to the lens system optical path is defined, the terms "above" and "downwardly" are to be considered relatively to the surface of the representation. Thus, if the representation is mounted in a vertical plane, for convenience, such "downward" movement occurs horizontally in actuality but is still downwards towards the representation.

Figure 2:
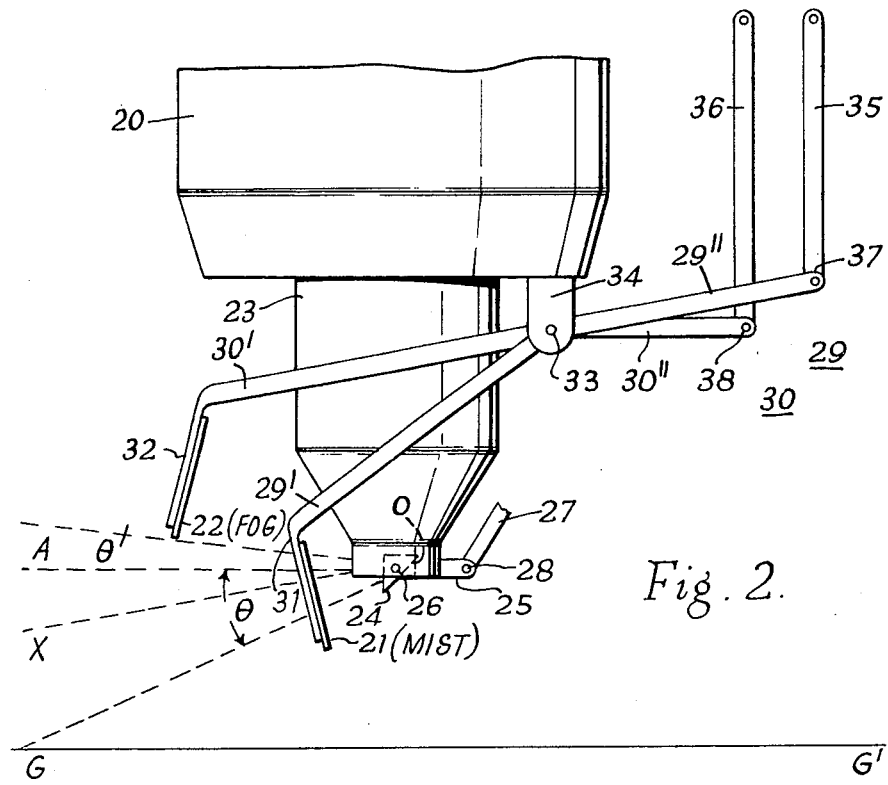

In order that the invention may more readily be carried into effect, an embodiment which combines both forms of the invention will now be described, by way of example, with reference to the accompanying drawings, in which:

FIG. 1 shows, in diagrammatic form, an aircraft in flight and the angular field of view from the aircraft, in a vertical plane, forward of the aircraft;

FIG. 2 shows, in diagrammatic form, a side elevation of a servo controlled optical/mechanical apparatus providing visibility effects corresponding to conditions where mist or fog or a layer of cloud is present in the vicinity of the earth's surface; and FIG. 3 is a schematic diagram showing the essential elements of electro-mechanical systems for controlling the operation of the arrangement of FIG. 2.

In FIG. 1, an aircraft 10 is flying a straight and level course, represented by the broken line O–A, in a direction from O to A. The angular field of view below and above the line O–A is indicated by $\theta$ and $\theta'$ respectively. In this instance the values of $\theta$ and $\theta'$ are 30 degrees and 6 degrees respectively.

The aircraft 10 is assumed to be flying at an altitude $h$ above the surface of the earth, part of which is represented in the diagram by the line G–G'. In normal conditions of visibility, objects at surface level are visible to the pilot of the aircraft at all points from the point P to the horizon. The position of the point P is determined by the angular field of view $\theta$.

In the presence of fog the maximum distance at which objects are visible to the pilot beyond the point P, varies with the density of the fog. In the diagram, it is assumed that the density of the fog is such that objects are visible only within the range extending from the point P to a point M. Therefore the range $r$ of the point M is the maximum range at which objects at surface level are then visible from the aircraft.

In a visual flight simulator the aircraft 10 and the ground G–G' are replaced by the camera and model respectively.

In a visual flight simulator, incorporating apparatus according to the present invention, which will be described in detail with reference to FIGS. 2 and 3, the presence of mist is simulated by interposing an optical screen in the path between the camera lens and the model. The optical characteristics of the screen are such that a poorly defined image is formed of that part of the model viewed through the said screen by the lens system.

The effect of flying in conditions of fog is simulated by interposing a movable translucent screen in the optical path between the camera and the model. The position of the screen is varied in a manner to reduce the unobscured angular field of view as the computed height of the aircraft increases, so that the maximum range at which objects on the model are visible to the pilot remains substantially constant. Improved simulation is provided using two screens in combination so that the definition of the image is reduced and the transition between the unobscured and obscured parts of the field of view appears to take place gradually.

At ground level, the angular field of view is a maximum, hence the position of the translucent screen should be related to the maximum range $r$ at which objects are visible to the pilot. If the displacement of the screen from a position corresponding to the "on-ground" condition is represented by D, then visibility conditions may be simulated approximately using the equation:

$$D = \frac{h+k}{r}$$

where $k$ is a constant corresponding to the height of a representation of the sky or skyscape provided by the model.

FIG. 2 shows mechanisms for varying the position of first and second optical screens 21 and 22 respectively, in the optical path of the camera of the simulator. The screens have the form of thin flat plates and are made of transparent plastic material, treated on one surface to modify their optical characteristics.

The screen 21 is partially transparent and provides simulated conditions of mist. The screen 22 is translucent and, in conjunction with the screen 21, provides simulated conditions corresponding to the presence of fog. The lens system of the camera is carried on a mount 23, attached to the body of the camera. In the diagram, part only of the body of the camera is shown, which is indicated by the reference number 20. The lens system views a model, represented by the line G–G' as in FIG. 1, in a direction generally along the length of the model, by way of a reflecting prism 24, and provides within the camera, an image of a portion of the model.

The prism 24 is attached to a movable support 25 which is mounted between pivots to rotate about an axis at right angles to the line G–G' and parallel to the plane of the model, in a manner to enable pitching effects to be simulated. One pivot 26 is shown in the drawing. The support 25 is rotated by a mechanism, not shown, which is coupled to the support by a link 27, via bearing 28, part only of the link being shown in the drawing.

The screen 21 is of rectangular shape and has one of its short sides attached to the extremity of a flat strip-like member 29' of an arm 29, having two members 29' and 29''. The screen 21 is attached to the member 29' by a clamp 31 with its long side towards the lens mount 23 and parallel to a line perpendicular to the plane of the drawing.

The screen 22 is of rectangular shape and has one of its short sides attached to the extremity of a flat strip like member 30' of an arm 30, having two members 30' and 30''. The screen 22 is attached to the member 30' by a clamp 32 with its long side towards the lens mount 23 and parallel to a line perpendicular to the plane of the drawing.

The arms 29 and 30 are supported by bearings, not shown, located at the junctions of the members 29', 29'' and 30', 30''. The bearings engage a common shaft 33, carried by a block 34, and are retained on the shaft by a slot in the block 34, not shown, through which both the shaft and the arms pass.

The block 34 is attached to the camera body 20, in a position to enable the screens 22 and 21 to be included in the optical path between the camera and the model by rotation of the arms about the shaft 33. For this purpose the member 29' is made shorter than the member 30'.

Motion is imparted to the arms 29 and 30 by mechanisms, mounted on the camera body 20, which are described later in this specification. The mechanisms are mechanically coupled to the members 29'' and 30'' by links 35 and 36 respectively, via bearings 37 and 38 respectively, located at the extremities of the members 29'' and 30''. The angular relationships between the members 29', 29'' and 30', 30'' are such that the arms and links move freely without fouling the camera body and provide, at the same time, an efficient transfer of motion from the links 35 and 36 to the arms 29 and 30.

The screens 21 and 22 are attached to the members 29' and 30' in such a way that an axis bisecting the angular field of view, represented by the broken line O–X is substantially normal to the plane of the screens, when they are interposed in the optical path between the lens/prism system and the model.

The transmission characteristic of the screen 21 is modified as for example by rubbing one surface of the screen lightly with an abrasive paper and partial repolishing. The screen 22 is rendered translucent as for example by rubbing one surface with abrasive paper until a uniform matt finish is produced.

Referring to FIG. 3, mechanisms for imparting motion to the links 35 and 36 of FIG. 2 are indicated generally at 40 and 41.

The mechanism 40 comprises a solenoid 42, having a movable armature 43, to which is attached the link 35, via bearing 43'. The armature 43 has a stem 44 which supports a helical spring 45. The spring 45 is maintained in a state of compression between a shoulder 46 on the armature and a bracket 47, mounted on the camera body, the bracket having a hole through which the stem 44 passes freely.

The solenoid 42 is supplied with current by way of switch 48, from a direct current source of supply connected to terminals 49 and 50. The switch 48 is located in that part of the simulator which is under control of an instructor, so that the operation of the mechanism may be controlled to suit the requirements of the exercise in progress at any time.

At the instant the switch 48 is closed, current is fed to the solenoid 42 and the armature moves in a direction indicated by arrow 51. By this action, the spring 45 is further compressed and the link 35 moves in a direction to cause the arm 30, FIG. 2, to take up a position such that the screen 21 is interposed in the optical path between the camera and the model, to simulate the presence of mist. The screen 21 is shown in this position in FIG. 2.

If the supply of current to the solenoid is interrupted, the armature is restored to the initial position by the action of the spring 45. Thus the screen 21 is withdrawn from the optical path and conditions corresponding to full visibility are restored.

Referring again to FIG. 3, the mechanism 41 comprises a position servo system, having an output shaft 52, driving a crank 53, to the crank pin of which is coupled the link 36, FIG. 2, by way of bearing 54.

The shaft 52 is rotated by a servo motor 55 via speed reduction gear 56 and friction clutch 57. The servo motor is supplied with current from an amplifier 58, having input terminals 59, 60 and 61.

An input signal applied to terminal 59, is answered by an opposing signal fed to terminal 60, derived from a potentiometer 62, which is fed with current from an alternating current source of supply, not shown, connected to terminal 63. The motor comes to rest when the input and "answer" signals have the same magnitude. Stabilising velocity feedback is provided by the winding of a generator 64 which is coupled to the shaft of the motor 55.

As already mentioned, visibility under conditions where fog is present may be simulated using the equation:

$$D = \frac{h+k}{r}$$

A signal corresponding to D is fed to terminal 59 from the wiper of a potentiometer 65. The winding is fed, via terminal 66, with current from an amplifier 67 having terminals 68 and 69. Terminal 68 is fed with a signal, represented by $h$, corresponding to the height of the simulated aircraft. This signal is derived from an element in the computer of the simulator, represented in the drawing by unit 70.

Terminal 60 is fed with a signal of constant value, represented by $k$, which is derived from a source of supply, not shown, in the flight simulator. The value of $k$ is such that the angular field of view above the horizontal line O–A, FIG. 2, is limited by the screen 22 to include only a skyscape view, provided by a part of the model, when the simulated aircraft is on the ground. The screen is shown in this position in FIG. 2.

The shaft of potentiometer 65 is mechanically coupled to a knob and dial 71, having an index 72. The dial has a scale which is calibrated to indicate the maximum range $r$ at which objects at surface level are visible to the pilot. Thus the signal fed to terminal 59 corresponds to $$\frac{h+k}{r}=D$$

A resistor 73 is connected between terminal 66 and the wiper of potentiometer 65 to modify its law and improve the shape of the scale.

The potentiometer 65 is located in that part of the simulator which is under the control of an instructor, so that the maximum range of visibility may be set to meet the requirements of an exercise.

The ratio of the speed reduction gear 56 is such that the shaft 52 rotates through an angle of approximately 60 degrees for variations in the value of D between $D_{min}$, where the range of visibility is a maximum and $h$ is zero, and $D_1$, where the range of visibility is a minimum and $h$ is substantially equal to the maximum height simulated in the apparatus.

The length of the crank 53 is such that the screen 22, FIG. 2, is moved wholly in or out of the optical path, by an angular displacement of the shaft 52 of about 55 degrees.

The crank 53 has an extension 74 which co-operates with a stop 75 to prevent further movement of the screen 22 beyond the position where the field of view is fully obstructed, that is to say, if the value of $D_1$ is exceeded by an appreciable amount.

For values of D in excess of value of $D_1$ the motor 55 continues to rotate, while the shaft 52 remains at rest by reason of slipping of the clutch 57. Hence for values of D intermediate the values of $D_{min}$ and $D_1$, the angular field of view in a vertical plane is varied to simulate the effect of flying in conditions of fog, the maximum range of visibility being adjustable so that fog of different densities may be simulated.

In the embodiment of the invention described with reference to FIGS. 2 and 3, the positions of the first and second optical screens are determined by separate mechanisms.

In an alternative arrangement, motion is imparted to arms, similar to the arms 29 and 30, by a single servo mechanism, similar to the mechanism 41. The arms are coupled together by a latching device which is released by setting a potentiometer control towards a position corresponding to minimum range of visibility, to allow the arms to move independently. When the latching device is released one of the arms is rotated by the action of a spring and a first screen is interposed in the optical path between the camera lens and the model, to provide simulated mist conditions.

Attached to the other arm is a second screen for simulating the effect of flying in conditions of fog. This screen is positioned to vary the angular field of view in a vertical plane, by a servo mechanism similar to the mechanism 41.

The arms are relatched by setting the potentiometer control first to the minimum and then the maximum range of visibility positions.

It is seen that in the present invention the visibility conditions are simulated using a screen associated with the camera, the position of the screen being varied with simulated altitude by means of a servo mechanism, so that the range of visibility is maintained at a desired value. The servo mechanism may be controlled remotely to vary the maximum range at ground level, at which objects are visible to the pilot. A second screen and its operating mechanism is also associated with the camera to enable conditions of mist to be simulated, as described above in connection with FIGURES 2 and 3. It is characteristic of the apparatus that the screen 22 is associated with the camera rather than the model.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What we claim is:

1. Ground-based flight training apparatus, including apparatus for simulating visual effects corresponding to the simulated flight of an aircraft comprising means providing a representation of the surface of the earth, a camera with a lens system for viewing at least a portion of the said representation, a first optical translucent screen mounted for movement into and out of the optical path between the lens system and the representation to partially obscure the camera view of the said representation and to simulate the presence of fog, a servo mechanism for varying with simulated altitude the position of said first screen so that the range of visibility is maintained at a desired value, a second optical translucent screen mounted for movement into and out of the optical path between the lens system and the representation to also partially obscure the camera view of said representation to simulate the presence of mist, and means being provided for using said first and second screens in combination, said first and second screens being associated with said camera rather than said representation means.

2. Ground-based flight training apparatus as claimed in claim 1, in which at least one of the said screens is mounted above the lens system for movement downwardly to intercept the optical path thereof and the said servo mechanism controls the movement of the optical screen so that the extent to which the optical path is intercepted varies according to the computed height of the simulated aircraft.

3. Ground-based flight training apparatus as claimed in claim 2, in which the servo mechanism is actuated according to a predetermined maximum range at which simulated objects at surface level are visible and the computed height of the simulated aircraft in such manner that the optical path is unobscured or is only partially obscured when the aircraft is at surface level and is increasingly obscured as the aircraft height increases.

4. Ground-based flight training apparatus as claimed in claim 3, in which the servo mechanism is supplied with a signal corresponding to the computed aircraft height derived from computing means in the said flight training apparatus.

5. Ground-based flight training apparatus as claimed in claim 1, in which the said screen is moved to intercept the whole of the optical path of the lens system, to simulate mist or like effect.

References Cited by the Examiner

UNITED STATES PATENTS

| | | | |
|---|---|---|---|
| 2,591,752 | 4/1952 | Wicklund | 35—12 |
| 2,711,593 | 6/1955 | Lewis et al. | 35—12 |
| 2,979,832 | 4/1961 | Klemperer | 35—12 |
| 2,981,008 | 4/1961 | Davis et al. | 35—12 |
| 3,012,337 | 12/1961 | Spencer et al. | 35—12 |
| 3,052,753 | 9/1962 | Schwarz et al. | 35—12 |
| 3,071,875 | 1/1963 | Hemstreet | 35—12 |
| 3,076,271 | 2/1963 | Marvin et al. | 35—12 |
| 3,114,979 | 12/1963 | Fox | 35—12 |
| 3,122,845 | 3/1964 | Kebbon | 35—12 |
| 3,127,685 | 4/1964 | Ellison | 35—12 |
| 3,131,487 | 5/1964 | Lyon et al. | 35—12 |

EUGENE R. CAPOZIO, *Primary Examiner.*

SHELDON M. BENDER, *Assistant Examiner.*